G. F. JAUBERT.
HYDROGEN GAS GENERATOR.
APPLICATION FILED AUG. 22, 1907.
943,022.
Patented Dec. 14, 1909.
2 SHEETS—SHEET 2.
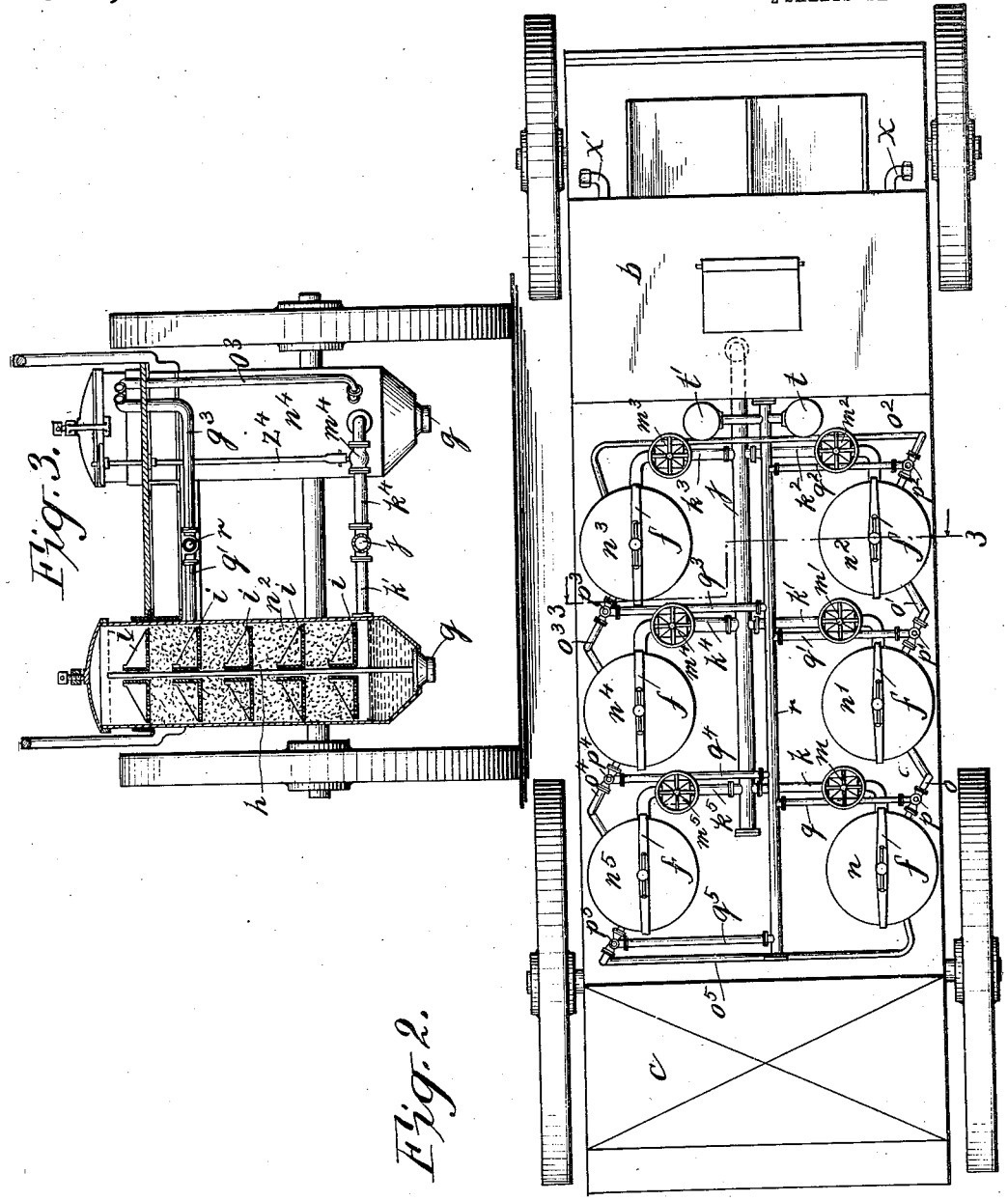
WITNESSES:
INVENTOR:
BY
ATTORNEYS

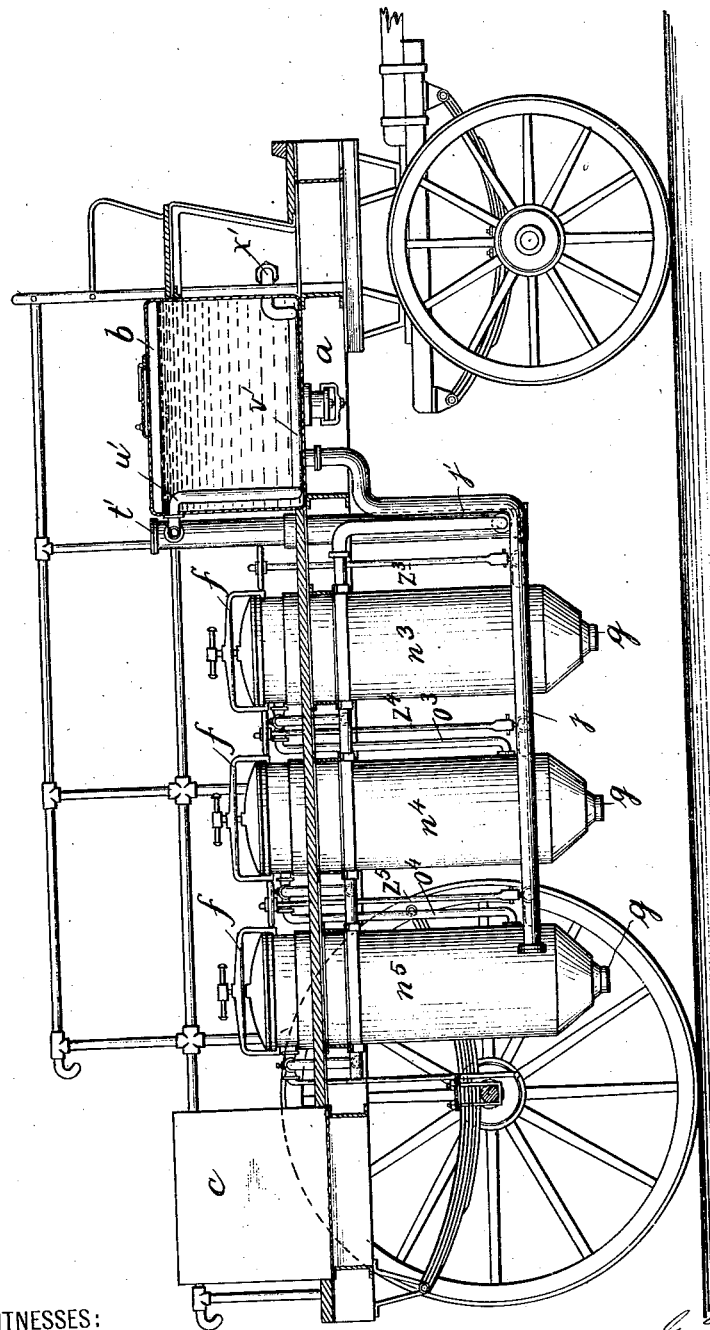

UNITED STATES PATENT OFFICE.

GEORGE FRANÇOIS JAUBERT, OF PARIS, FRANCE.

HYDROGEN-GAS GENERATOR.

943,022.  Specification of Letters Patent.  Patented Dec. 14, 1909.

Application filed August 22, 1907. Serial No. 389,721.

*To all whom it may concern:*

Be it known that I, GEORGE FRANÇOIS JAUBERT, a citizen of the Swiss Republic, residing at 155 Boulevard Malesherbes, Paris, France, have invented certain new and useful Improvements in Hydrogen-Gas Generators, of which the following is a specification.

This invention has for its object means for the manufacture and purification of gas or vapor in a dry and cold state by means of the decomposing action of an appropriate chemical substance liberating much heat in the presence of water or other appropriate liquid.

The inventor has noticed, particularly in the industrial preparation of hydrogen by means of the action of water upon calcium hydrid and hydrids in general, the production of a considerable rise of temperature causing the vaporization of the water which results in an excessive consumption of the water employed, and further in the formation of hydrogen charged with a large quantity of water vapor which is prejudicial in inflating balloons for example.

The invention has for its object means for obviating these defects.

The accompanying drawings show by way of example a constructional form of the apparatus mounted upon a carriage and intended for producing hydrogen for filling balloons in the field.

Figure 1 represents a side elevation and partial section through the apparatus. Fig. 2 represents a plan view of the same. Fig. 3 represents a cross-section through the apparatus on line 3—3 of Fig. 2.

The process consists in successively and progressively attacking a chemical substance or a series of different chemical substances, first of all by the water (or other liquid), and then by the mixture of the water vapor produced and the gases liberated; for the purpose of increasing the proportion of the liberated gases, in proportion as the amount of water and water vapor diminishes, and thus obtaining dry gas or vapors adapted to be readily cooled owing to the absence of any condensable humid vapor.

The device is employed as follows:—The front platform of the frame $a$ of the carriage carries a water reservoir $b$; the rear platform carries a box $c$ containing a supply of calcium hydrid for example. In the center of the frame there are suspended the gas generators $n$, $n'$, $n^2$, $n^3$, $n^4$ and $n^5$, preferably arranged in two rows of three in the direction of the length of the carriage in such a manner as to leave a free passage in the middle. These vertical generators or cylinders have an upper yoke-and-screw closing device $f$ and a conical discharging hole at the lower part which is closed by a plug $g$ at the end of a rod $h$ which passes through the entire height of the generator. On this rod, perforated washers or plates $i$, of sheet metal for example, are adapted to slide; they are intended to divide the mass of calcium hydrid or other pure or mixed chemical products liberating hydrogen in contact with water. From the bottom of the water reservoir $b$ there proceeds a collector $j$ which unites the bases of the generators by branches $k$, $k'$, $k^2$, $k^3$, $k^4$ and $k^5$, each containing a valve or door $m$, $m'$, $m^2$, $m^3$, $m^4$ and $m^5$, adapted to be operated from the platform by the vertical rods $z$, $z'$, $z^2$, $z^3$, $z^4$ and $z^5$ with operating wheels. Each generator, $n$ for example, is connected to the following generator $n'$ by a gas liberation pipe $o$ proceeding from the head of the said generator $n$ and terminating at the base of the following generator $n'$. Each of these pipes $o$, $o'$, $o^2$, $o^3$, $o^4$ and $o^5$ contains a three-way cock $p$ from which there proceeds a pipe $q$ passing to a gas collecting tube $r$ which extends from the rear to the front of the carriage underneath the platform and is bent at the front part as shown in Fig. 1 and then branches off to two purifiers $t$, $t'$. These purifiers inclose substances absorbing the impurities which the gas may contain, ammonia in particular. Each purifier is connected to a discharge pipe, of which one is shown at $u'$, entering the water reservoir $b$ at the bottom of which each of these pipes forms a coil, as $v'$, which coils terminate outside the water reservoir $b$ in gas outlet sockets $x$, $x'$.

The operation is as follows:—All the cocks being closed, the water reservoir $b$ is filled and the generators are charged, the emptying plug $g$ being replaced and the lower plate or washer $i$ being passed onto the rod $h$. The first charge, of calcium hydrid for example, is supplied, the second washer $i$ is placed in position and upon this a second charge is placed and so on in succession until the generator is filled. The cover $f$ is then applied so that it forms a good joint whereupon the following generators are charged in the same manner. The cock $p$ is arranged in such a manner as to isolate the generator $n$ from the collector $r$ and place it in communication with the following generator $n'$ which is isolated by means of the cock $p'$ from the following generator $n^2$ to place it in communication with the collector $r$. The valve or door $m$ between the water collector $j$ and the generator $n$ is opened, the water enters the generator $n$ at its base, rises therein, producing a liberation of gas and of water vapor which passes into the generator $n'$ where this mixture attacks the fresh calcium hydrid which absorbs the water vapor, liberating a fresh quantity of gas which proceeds to the collector $r$ through the corresponding branch. From this collector $r$ the gas passes through the purifiers $t$ and $t'$, thence through the pipes $u'$ to the coils $v'$ and then to the gas outlet sockets $x$ and $x'$. When the hydrid in the generator $n$ is exhausted, it is completely isolated by acting upon the door $m$ and the cock $p$. The generators $n'$ and $n^2$ are then placed in communication, the latter is caused to communicate with the gas collector after it has been appropriately isolated from the following generator $n^3$. Water is admitted through the door $m'$ to the generator $n'$ and the apparatus operates with these two generators $n'$ and $n^2$ as before. This procedure is continued with the remaining generators in succession. The generators as they become exhausted may be emptied, and a fresh charge introduced, without interrupting the cycle of operations.

The advantages are as follows:—The successive action or attack upon the calcium hydrid by the water serves to produce an absolutely dry gas with a quantity of water approximating the quantity theoretically necessary. As the specific heat of a gas in a dry state is very low, the simple passage of this gas through the coils $v'$ will be sufficient to lower the temperature to an extent permitting of the immediate untilization of the gas. The preliminary production of water vapor in the first generator gives rise in the following generator, before hydrogen is liberated, to an expulsion of the atmospheric air which might present dangers of explosion when certain products are employed. The division of the mass of hydrid in each of the generators by the perforated plates or washers $i$ serves to avoid any projection of material, and also to cause the residues to descend naturally to the base of the generator. The arrangement in battery permits of obtaining a continuous production, as it is possible during the course of the operations to re-charge the exhausted generators as and when required. Starting is very speedily effected, as it is only necessary that two generators should be charged to enable operations to be commenced.

It will of course be understood that the process may be carried into practice by means of a fixed installation or of a single generator in the form of a column provided with plates upon which the substance, calcium hydrid for example, traversed by the mixture of water vapor and hydrid produced at the base of the column, is placed. It is also possible to utilize an arrangement presenting the form of horizontal stage ovens with partitions or otherwise and the successive generators may receive chemical products of different natures.

The invention is applicable to the preparation of hydrogen and of all gases or vapors obtainable from the decomposition of all chemical substances capable of liberating the said gases or vapors, with rise of temperature, under the decomposing action of water or of another liquid liberating vapors during the re-action.

Having now particularly described and ascertained the nature of my said invention and in what manner the same is to be performed, I declare that what I claim is:—

1. In an apparatus of the character described, a plurality of generating compartments, a liquid-supply pipe having a branch connecting with each generating compartment, a shut-off cock in each branch, a leading-off pipe for the gases and vapors extending from each compartment to the initial portion of the next succeeding compartment, a gas-collecting pipe, a branch from each leading-off pipe connecting with the gas-collecting pipe, and a shut-off cock in each of said branches whereby the generating compartments may be connected, isolated and operated in the manner described.

2. In an apparatus of the character described, a plurality of generating compartments, a liquid-supply pipe having a branch connecting with each generating compartment, a shut-off cock in each branch, a leading-off pipe for the gases and vapors extending from each compartment to the initial portion of the next succeeding compartment, a gas-collecting pipe, a branch from each leading-off pipe connecting with the gas-collecting pipe, a shut-off cock in each of said branches whereby the generating compartments may be connected, isolated, and operated in the manner described, and an apparatus connected with the gas collecting pipe for cooling the gases.

3. In an apparatus of the character described, a generating compartment comprising a casing have a discharge opening at one end and a removable cover for the other end, a plug for the discharge opening, a rod extending from the plug into the compartment, and perforated plates slidable on said rod for dividing the mass of material in the generating compartment; substantially as described.

4. In an apparatus of the character described, a generating compartment comprising a vertical casing having a central discharge opening at one end, and a removable cover for the other end, a plug supported in the discharge opening, a rod extending from the plug axially of the generating compartment, and perforated plates slidable on said rod for dividing the mass of material in the generating compartment, substantially as described.

5. In an apparatus of the character described, a generating compartment, comprising a vertical casing $n$, having a central discharge opening closed by the plug $g$ at its lower end, a removable cover at its upper end, the rod $h$ supported in the plug $g$, and the perforated plates $i$ slidable on said rod for dividing the mass of material in the generating compartment; substantially as described.

6. In an apparatus of the character described, a vehicle carrying two separated rows of generating compartments, a storage receptacle for the material to be used in the generating compartment, and a liquid-reservoir, in combination with liquid distributing pipes and gas collecting pipes communicating with each generating compartment; substantially as described.

7. In an apparatus of the character described, a vehicle carrying two separated rows of generating compartments, a storage receptacle $c$ at one end of said rows, a liquid-reservoir $b$ at the other end of said rows, in combination with the liquid-distributing pipes and gas-collecting pipes communicating with each generating compartment, the main gas-collecting pipe being divided and connected to purifiers, and pipes leading from the purifiers and coiled in the liquid-reservoir; substantially as described.

In testimony whereof I have hereunto placed my hand at Paris this tenth day of August 1907.

GEORGE FRANÇOIS JAUBERT.

In the presence of two witnesses:
HANSON C. COXE,
ALBERT NUNÈS.